Dec. 29, 1953  A. J. LEWUS  2,664,532
CONTROL CIRCUITS FOR INDUCTION MOTORS
Filed Jan. 15, 1952  3 Sheets-Sheet 1

FIG. 1

INVENTOR.
Alexander J. Lewus
BY
Smith, Olsen + Baird
Attys.

Patented Dec. 29, 1953

2,664,532

UNITED STATES PATENT OFFICE 2,664,532

CONTROL CIRCUITS FOR INDUCTION MOTORS

Alexander J. Lewus, Cicero, Ill.

Application January 15, 1952, Serial No. 266,559

10 Claims. (Cl. 318—203)

1

The present invention relates to control circuits for induction motors and more particularly to starting-running-braking circuits for such motors of the capacitor type.

It is the general object of the present invention to provide in a circuit of the character noted a circuit controller that is selectively operative between an off position and forward and reverse positions for the purpose of selectively starting and running the rotor of the associated induction motor in the respective forward and reverse directions, wherein the controller is arranged not only to disconnect the windings of the motor from the associated source of power supply when it is returned from either its forward position or its reverse position back into its off position, but also to complete a dynamic braking circuit for the rotor.

Another object of the invention is to provide a circuit controller in a circuit of the character noted, wherein the controller is arranged to employ an associated capacitor both for selective starting of the rotor of the motor in the opposite directions, but also for dynamic braking of the rotor when the controller is returned back into its off position.

A further object of the invention is to provide a circuit controller in a circuit of the character noted, wherein the controller is provided with an off position and final forward and reverse positions disposed on opposite sides of the off position and intermediate forward and reverse positions respectively disposed between the off position and the final forward and reverse positions, and wherein the controller effects dynamic braking of the motor in the off position and in the intermediate forward and reverse positions in order positively to insure that the rotor is stopped instantly and reversed instantly when the controller is quickly operated from one of its final positions to the other of its final positions.

A still further object of the invention is to provide a circuit controller for starting and running and braking the reversible rotor of an induction motor of the single-phase split-phase type, including a stator provided with angularly displaced main and auxiliary windings, wherein the auxiliary winding and an associated capacitor are employed for starting the rotor in either direction and for braking the rotor when the controller is returned from either its forward position or its reverse position back into its off position.

Further features of the invention pertain to the particular connection and arrangement of the elements of the electric motor and of the circuit controller, whereby the above-outlined and additional operating features thereof are attained.

The invention, both as to its organization and

2 method of operation, together with further objects and advantages thereof, will best be understood by reference to the following specification taken in connection with the accompanying drawings, in which Figure 1 is a diagrammatic illustration of a starting-running-braking circuit for a single-phase split-phase induction motor of the capacitor type, and including a circuit controller, and embodying the present invention; Fig. 2 is a diagrammatic illustration of a modified form of the circuit; and Fig. 3 is a diagrammatic illustration of another modified form of the circuit.

Figure 1:
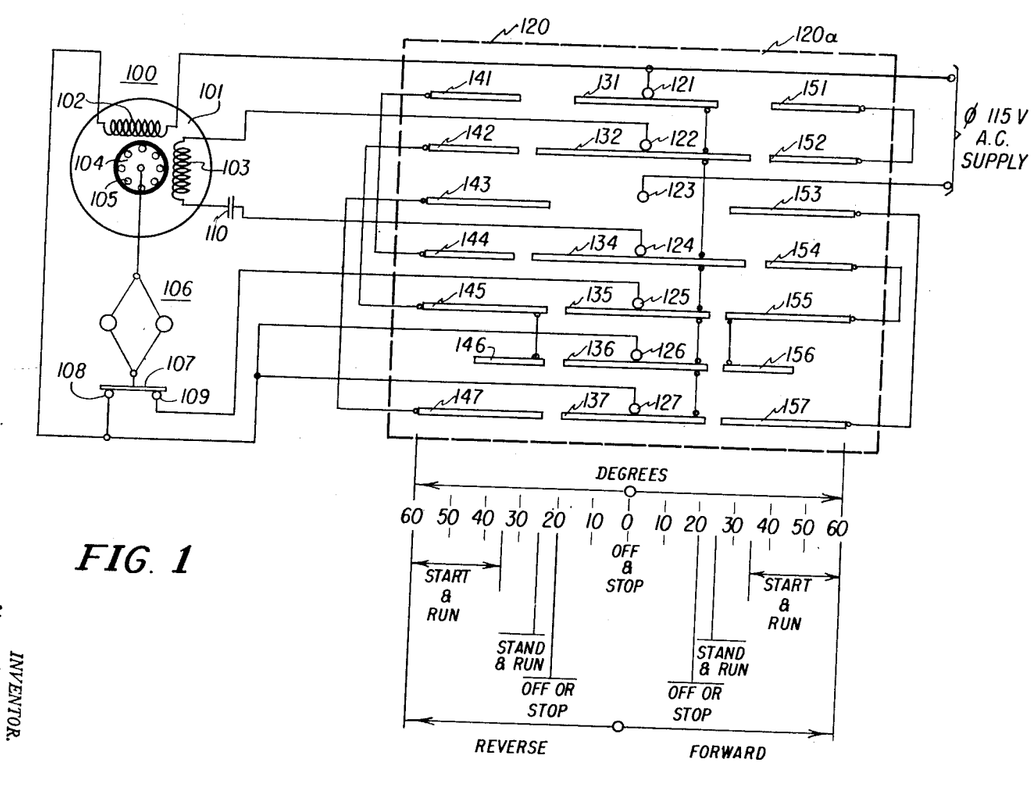

Referring now to Fig. 1 of the drawings, there is illustrated a starting-running-braking circuit embodying the features of the present invention and comprising an electric motor 100 of the single-phase split-phase induction type including a stator 101 provided with angularly displaced main and auxiliary windings 102 and 103 and a reversible rotor 104 provided with a squirrel-cage winding 105. The rotor 104 is mounted upon an associated shaft, not shown, to which there is operatively connected a centrifugal switch 106 provided with a bridging member 107 controlling associated contacts 108 and 109. The centrifugal switch 106 is responsive to rotation of the rotor 104 in either direction at a speed somewhat in excess of 75% of the synchronous speed thereof to move the bridging member 107 into open circuit position with respect to the contacts 108 and 109, and is responsive to rotation of the rotor 104 in either direction at a speed considerably less than 75% of the synchronous speed thereof to move the bridging member 107 back into its normal closed circuit position with respect to the contacts 108 and 109.

Further the circuit comprises a source of single-phase alternating current supply that may be of 115 volts, a capacitor 110 and a circuit controller 120 that may be of any conventional type. Specifically the controller 120 may comprise supporting structure, not shown, rotatably mounting a drum 120a (illustrated in flatwise relation) and having an off position and forward and reverse positions as indicated. The supporting structure carries seven stationary contacts 121 to 127, inclusive, that are operatively associated with the individual contacts in three sets carried by the rotatable drum 120a. Specifically the rotatable drum 120a carries a set of off contacts, including the individual contacts 131, 132, 134, 135, 136 and 137, respectively cooperating with the stationary contacts 121, 122, 124, 125, 126 and 127; a set of forward contacts 141 to 147, inclusive, respectively cooperating with the stationary contacts 121 to 127, inclusive; and a set of reverse contacts 151 to 157, inclusive, respectively cooperating with the stationary contacts 121 to 127, inclusive.

In the circuit, the upper line conductor of the source of power supply is connected commonly to the stationary contact 121 and to one terminal of the main winding 102; while the lower line conductor of the source of power supply is connected to the stationary contact 123. The other terminal of the main winding 102 is commonly connected to the switch contact 108 and to the stationary contacts 126 and 127; while the other switch contact 109 is connected to the stationary contact 125. One terminal of the auxiliary winding 103 is connected to the stationary contact 122 and the other terminal thereof is connected to one terminal of the capacitor 110, the other terminal of the capacitor 110 being connected to the stationary contact 124. The drum contacts 131, 132, 134, 135, 136, and 137 are commonly connected together; the drum contacts 141 and 144 are connected together; the drum contacts 142, 145 and 146 are commonly connected together; the drum contacts 143 and 147 are connected together; the drum contacts 151 and 152 are connected together; the drum contacts 153 and 157 are connected together; and the drum contacts 154, 155 and 156 are commonly connected together.

The spread of the drum off contacts 131, 135, 136 and 137 is from 0° at the off and stop position approximately 20° on either side thereof in the forward and reverse directions; and the spread of the drum off contacts 132 and 134 is from 0° at the off and stop position approximately 30° on either side thereof in the forward and reverse directions. The drum forward contacts 141, 142 and 144 have a spread in the forward direction from about 35° to 60°; the drum forward contacts 143, 145 and 147 have a spread in the forward direction from about 25° to 60°; while the drum forward contact 146 has a spread in the forward direction from about 25° to 45°. Similarly the drum reverse contacts 151, 152 and 154 have a spread in the reverse direction from about 35° to 60°; the drum reverse contacts 153, 155 and 157 have a spread in the reverse direction from about 25° to 60°; while the drum reverse contact 156 has a spread in the reverse direction from about 25° to 45°.

Considering now the operation of the motor 100, when the controller 120 occupies its off position, the main and auxiliary windings 102 and 103 are deenergized, and the main winding 102 is short-circuited, and the auxiliary winding 103 and the capacitor 110 are shorted in series relation. When the drum 120a is rotated in the forward direction (to the right in Fig. 1) somewhat in excess of 20°, the short-circuit across the main winding 102 is interrupted; and when the drum 120a is rotated further in the forward direction 25°, the main winding 102 is energized. More particularly, the main winding 102 is connected via the stationary contacts 127 and 123 and the drum contacts 147 and 143 directly across the line conductors of the source of power supply. When the drum 120a is rotated further in the forward direction 30°, the short across the auxiliary winding 103 and the capacitor 110 in series relation is interrupted; and when the drum 120a is rotated further in the forward direction 35°, the auxiliary winding 103 is energized. Specifically, one terminal of the auxiliary winding 103 is connected via the stationary contact 122, the drum contacts 142, 145 and 146, the stationary contacts 126 and 127, the drum contacts 147 and 143, and the stationary contact 123 to the lower line conductor of the source of power supply; while one terminal of the capacitor 110 is connected via the stationary contacts 124 and 121 and the drum contacts 144 and 141 to the upper line conductor of the source of power supply. Accordingly, the main and auxiliary windings 102 and 103 are energized, the auxiliary winding 103 and the capacitor 110 being poled in the forward direction with respect to the main winding 102; whereby the rotating fields in the stator 101 effect induction in the squirrel-cage winding 105 so that the rotor 104 is started in the forward direction.

As the drum 120a is rotated still further in the forward direction somewhat in excess of 45°, the drum contact 146 disengages the stationary contact 126 encircuiting the centrifugal switch 106. Accordingly, at this time, the lower line conductor of the source of power supply is connected via the stationary contact 123, the drum contacts 143 and 147, the stationary contact 127, the switch contacts 108 and 109, the bridging member 107, the stationary contact 125, the drum contacts 145 and 142, and the stationary contact 122 to one terminal of the auxiliary winding 103. Accordingly, when the rotor 104 is accelerated in the forward direction to a speed somewhat in excess of 75% of the synchronous speed thereof, the centrifugal switch 106 operates the bridging member 107 into its open position with respect to the switch contacts 108 and 109, so as to effect deenergization of the auxiliary winding 103 and the capacitor 110 in series relation. At this time, the rotor 104 is accelerated on into its forward running speed, slightly below the synchronous speed by the slip speed, as a result of the energization of the main winding 102; and the rotor 104 is operated at the running speed in the forward direction entirely by the energization of the main winding 102.

In order to arrest forward rotation of the rotor 104, the drum 120a is returned back into its off position. When the drum 120a is rotated back into its 45° forward position, the drum contact 146 again engages the stationary contact 126 for the purpose of short-circuiting the switch contacts 108 and 109, whereby the auxiliary winding 103 and the capacitor 110 are again energized over the initial circuit previously traced. Thereafter when the drum 120a is returned back toward its off position somewhat less than its 35° forward position, the drum contacts 141, etc., disengage the stationary contacts 121, etc., so that the auxiliary winding 103 is deenergized. Further when the drum 120a is rotated back toward its off position from its 30° forward position on into its 0° position, the drum contacts 132 and 134 engage the stationary contacts 122 and 124 completing the previously traced short across the auxiliary winding 103 and the capacitor 110 in series relation; and until the drum 120a is returned back toward its off position somewhat less than its 25° forward position, the main winding 102 is energized, whereby the forward rotation of the rotor 104 is instantly dynamically braked causing the rotor 104 instantly to assume its rest position. At somewhat less than the 25° forward position of the drum 120a, the drum contacts 146 and 147 disengage the stationary contacts 126 and 127 interrupting the circuit for energizing the main winding 102. Finally, when the drum 120a is returned into its 20° forward position, the short-circuit across the main winding 102 is completed further to insure that the rotor 104 occupies its rest position.

When the drum 120a is rotated from its off position in the reverse direction (to the left in Fig. 1) somewhat in excess of 20°, the short-circuit across the main winding 102 is interrupted; and when the drum 120a is rotated further in the reverse direction 25°, the main winding 102 is energized. More particularly, the main winding 102 is connected via the stationary contacts 127 and 123 and the drum contacts 157 and 153 directly across the line conductors of the source of power supply. When the drum 120a is rotated further in the reverse direction 30°, the short across the auxiliary winding 103 and the capacitor 110 in series relation is interrupted; and when the drum 120a is rotated further in the reverse direction 35°, the auxiliary winding 103 is energized. Specifically, one terminal of the auxiliary winding 103 is connected via the stationary contacts 122 and 121 and the drum contacts 152 and 151 to the upper line conductor of the source of power supply; while one terminal of the capacitor 110 is connected via the stationary contacts 124, the drum contacts 154, 155 and 156, the stationary contacts 126 and 127, the drum contacts 157 and 153 and the stationary contact 123 to the lower line conductor of the source of power supply. Accordingly, the main and auxiliary windings 102 and 103 are energized, the auxiliary winding 103 and the capacitor 110 being poled in the reverse direction with respect to the main winding 102; whereby the rotating fields in the stator 101 effect induction in the squirrel-cage winding 105 so that the rotor 104 is started in the reverse direction.

As the drum 120a is rotated still further in the reverse direction somewhat in excess of 45°, the drum contact 156 disengages the stationary contact 126, encircuiting the centrifugal switch 106. Accordingly, at this time, the lower line conductor of the source of power supply is connected via the stationary contact 123, the drum contacts 153 and 157, the stationary contact 127, the switch contacts 108 and 109, the bridging member 107, the stationary contact 125, the drum contacts 155 and 154, and the stationary contact 124 to one terminal of the capacitor 110. Accordingly, when the rotor 104 is accelerated in the reverse direction to a speed somewhat in excess of 75% of the synchronous speed thereof, the centrifugal switch 106 operates the bridging member 107 into its open position with respect to the switch contacts 108 and 109, so as to effect deenergization of the auxiliary winding 103 and the capacitor 110 in series relation. At this time, the rotor 104 is accelerated on into its normal reverse running speed, slightly below the synchronous speed by the slip speed, as a result of the energization of the main winding 102; and the rotor 104 is operated at the running speed in the reverse direction entirely by the energization of the main winding 102.

In order to arrest reverse rotation of the rotor 104 the drum 120a is returned back into its off position. When the drum 120a is rotated back into its 45° reverse position, the drum contact 156 again engages the stationary contact 126 for the purpose of short-circuiting the switch contacts 108 and 109, whereby the auxiliary winding 103 and the capacitor 110 are again energized over the initial circuit previously traced. Thereafter when the drum 120a is returned back toward its off position somewhat less than its 35° reverse position, the drum contacts 151, etc., disengage the stationary contacts 121, etc., so that the auxiliary winding 103 is deenergized. Further, when the drum 120a is rotated back toward its off position from its 30° reverse position on into its 0° position, the drum contacts 132 and 134 engage the stationary contacts 122 and 124 completing the previously traced short across the auxiliary winding 103 and the capacitor 110 in series relation; and until the drum 120a is returned back toward its off position somewhat less than its 25° reverse position, the main winding 102 is energized; whereby the reverse rotation of the rotor 104 is instantly dynamically braked causing the rotor 104 instantly to assume its rest position. At somewhat less than the 25° reverse position of the drum 120a, the drum contacts 156 and 157 disengage the stationary contacts 126 and 127 interrupting the circuit for energizing the main winding 102. Finally, when the drum 120a is returned into its 20° reverse position, the short-circuit across the main winding 102 is completed further to insure that the rotor 104 occupies its rest position.

In view of the foregoing, it will be appreciated that since the rotor 104 is instantly dynamically braked when the drum 120a is operated from either its forward position or its reverse position back into its off position, and since the centrifugal switch 106 is by-passed in the 25°–45° forward position and in the 25°–45° reverse position of the drum 120a, the drum 120a may be quickly operated from either of its extreme positions into the other of its extreme positions with the absolute assurance that the direction of rotation of the rotor 104 will be instantly reversed.

In passing, it is noted that the drum 120a is normally biased by means, not shown, into its off position and may be restrained by means, not shown, in each of its forward and reverse positions in an obvious manner.

Figure 2:
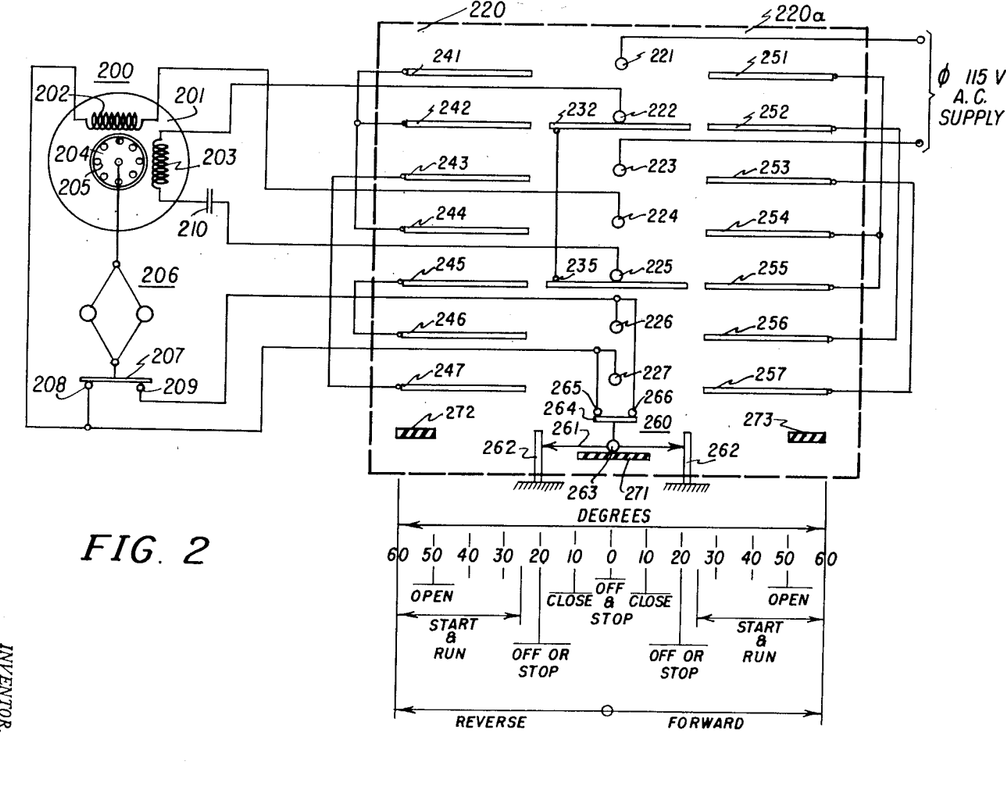

Referring now to Fig. 2 of the drawings, there is illustrated a modified form of the starting-running-braking circuit embodying the features of the present invention and comprising an electric motor 200 of the single-phase split-phase injunction type including a stator 201 provided with angularly displaced main and auxiliary windings 202 and 203 and a reversible rotor 204 provided with a squirrel-cage winding 205. The rotor 204 is mounted upon an associated shaft, not shown, to which there is operatively connected a centrifugal switch 206 provided with a bridging member 207 controlling associated contacts 208 and 209. The centrifugal switch 206 is responsive to rotation of the rotor 204 in either direction at a speed somewhat in excess of 75% of the synchronous speed thereof to move the bridging member 207 into open circuit position with respect to the contacts 208 and 209, and is responsive to rotation of the rotor 204 in either direction at a speed considerably less than 75% of the synchronous speed thereof to move the bridging member 207 back into its normal closed circuit position with respect to the contacts 208 and 209.

Further, the circuit comprises a source of single phase alternating current supply that may be of 115 volts, a capacitor 210 and a circuit controller 220 that may be of any conventional type. Specifically, the controller 220 may comprise supporting structure, not shown, rotatably mounting a drum 220a (illustrated in flatwise relation) and having an off position and forward and reverse positions as indicated. The supporting structure carries seven stationary contacts 221 to 227, inclusive, that are operatively associated with the individual contacts in three sets carried by the rotatable drum 220a. Specifically, the rotatable drum 220a carries a set of off contacts, including the individual contacts 232 and 235, respectively cooperating with the stationary contacts 222 and 225; a set of forward contacts 241 and 247, inclusive, respectively cooperating with the stationary contacts 221 to 227, inclusive; and a set of reverse contacts 251 to 257, inclusive, respectively cooperating with the stationary contacts 221 to 227, inclusive. Also the controller 220 comprises a single-pole single-throw snap-acting switch 260 that is preferably of the toggle-action type, including a pair of hinged toggle arms 261 mounted upon blocks 262 carried by the supporting structure, not shown, as well as a toggle set and trip member 263, a contact bridging member 264 and a pair of switch contacts 265 and 266. Further the drum 220a carries an off setting member 271, a forward setting member 272, and a reverse setting member 273 cooperating with the member 263, the off setting member 271 has a spread from 0° at the off and stop position approximately 10° on either side thereof in the forward and reverse directions. The forward setting member 272 has a spread in the forward direction from about 50° to 60°, while the reverse setting member 273 has a spread in the reverse direction from about 50° to 60°.

In the circuit, the line conductors of the source of supply are respectively connected to the stationary contacts 221 and 223. One terminal of the main winding 202 is connected to the stationary contact 224 and the other terminal of the main winding 202 is commonly connected to the switch contact 208, to the stationary contact 227 and to the switch contact 265; the other switch contact 209 is commonly connected to the stationary contact 226 and to the switch contact 266. One terminal of the auxiliary winding 203 is connected to the stationary contact 222 and the other terminal thereof is connected to one terminal of the capacitor 210, the other terminal of the capacitor 210 being connected to the stationary contact 225. The drum contacts 232 and 235 are connected together; the drum contacts 241, 242 and 244 are commonly connected together; the drum contacts 243 and 247 are connected together; the drum contacts 245 and 246 are connected together; the drum contacts 251, 254 and 255 are commonly connected together; the drum contacts 252 and 256 are connected together; and the drum contacts 253 and 257 are connected together.

The spread of the drum off contacts 232, etc., is from 0° at the off and stop position approximately 20° on either side thereof in the forward and reverse directions. The drum off contacts 232, etc., are separated from the drum forward contacts 241, etc., by approximately 5° in the forward direction, and separated from the drum reverse contacts 251, etc., by approximately 5° in the reverse direction. Further the drum forward contacts 241, etc., have a spread in the forward direction from about 25° to 60°. Similarly the drum reverse contacts 251, etc., have a spread in the reverse direction from about 25° to 60°.

Considering now the operation of the motor 200, when the controller 220 occupies its off position, the main and auxiliary windings 202 and 203 are deenergized, the snap switch 260 occupies its closed position, and the auxiliary winding 203 and the capacitor 210 are shorted in series relation. When the drum 220a is rotated in the forward direction (to the right in Fig. 2) somewhat in excess of 20°, the short across the auxiliary winding 203 and the capacitor 210 in series relation is interrupted; and when the drum 220a is rotated further in the forward direction 25°, the starting circuits for the motor 200 are completed. More particularly, the main winding 202 is connected via the stationary contacts 224 and 221 and the drum contacts 244 and 241 and the stationary contacts 227 and 223 and the drum contacts 247 and 243 directly across the line conductors of the source of power supply. One terminal of the auxiliary winding 203 is connected via the stationary contact 222, the drum contacts 242 and 241 and the stationary contact 221 to the upper line conductor of the source of power supply; while one terminal of the capacitor 210 is connected via the stationary contact 225, the drum contacts 245 and 246, the stationary contact 226, the switch contacts 266 and 265, the bridging member 264, the stationary contact 227, the drum contacts 247 and 243 and the stationary contact 223 to the lower line conductor of the source of power supply. Accordingly, the main and auxiliary windings 202 and 203 are energized, the auxiliary winding 203 and the capacitor 210 being poled in the forward direction with respect to the main winding 202; whereby the rotating fields in the stator 201 effect induction in the squirrel-cage winding 205 so that the rotor 204 is started in the forward direction.

As the drum 220a is rotated still further in the forward direction 50° the member 272 engages the member 263 operating the snap switch 260 into its open position, encircuiting the centrifugal switch 206. Accordingly, at this time, the lower line conductor of the source of power supply is connected via the stationary contact 223, the drum contacts 243 and 247, the stationary contact 227, the switch contacts 208 and 209, the bridging member 207, the stationary contact 226, the drum contacts 246 and 245, and the stationary contact 225 to one terminal of the capacitor 210. Accordingly, when the rotor 204 is accelerated in the forward direction to a speed somewhat in excess of 75% of the synchronous speed thereof, the centrifugal switch 206 operates the bridging member 207 into its open position with respect to the switch contacts 208 and 209 so as to effect deenergization of the auxiliary winding 203 and the capacitor 210 in series relation. At this time, the rotor 204 is accelerated on into its forward running speed, slightly below the synchronous speed by the slip speed, as a result of the energization of the main winding 202; and the rotor 204 is operated at the running speed in the forward direction entirely by the energization of the main winding 202.

In order to arrest forward rotation of the rotor 204, the drum 220a is returned back into its off position. When the drum 220a is rotated back toward its off position somewhat less than its 25° forward position, the drum contacts 241, etc., disengage the stationary contacts 221, etc., so that the main and auxiliary windings 202 and 203 are deenergized. Further when the drum 220a is rotated back toward its off position from its 20° forward position on into its 0° position, the drum contacts 232 and 235 engage the stationary contacts 222 and 225 respectively completing the previously traced short across the auxiliary winding 203 and the capacitor 210 in series relation. Finally when the drum 220a is rotated back into its 10° forward position, the member 271 engages the member 263 operating the snap switch 260 back into its closed position. At this time, the rotor 204 is still rotating in the forward direction, whereby the residual magnetism in the stator 201 causes the squirrel-cage winding 205 to induce a voltage in the auxiliary winding 203, whereby current circulates therefrom through the capacitor 210 in series relation producing an additional magnetic flux that reacts with the squirrel-cage winding 205, whereby the reaction tends to rotate the rotor 204 in the reverse direction so that rotation of the rotor 204 in the forward direction is quickly dynamically braked causing the rotor 204 quickly to assume its rest position.

When the drum 220a is rotated from its off position in the reverse direction (to the left in Fig. 2) somewhat in excess of 20°, the short across the auxiliary winding 203 and the capacitor 210 in series relation is interrupted; and when the drum 220a is rotated further in the reverse direction 25° the starting circuits for the motor 200 are completed. More particularly, the main winding 202 is connected via the stationary contacts 224 and 221, the drum contacts 254 and 251, the stationary contacts 227 and 228, and the drum contacts 257 and 258 directly across the line conductors of the source of power supply. One terminal of the auxiliary winding 203 is connected via the stationary contact 222, the drum contacts 252 and 256, the stationary contact 226, the switch contacts 268 and 265, the bridging member 264, the stationary contact 227, the drum contacts 257 and 253 and the stationary contact 228 to the lower line conductor of the source of power supply; while one terminal of the capacitor 210 is connected via the stationary contact 225, the drum contacts 255 and 251 and the stationary contact 221 to the upper line conductor of the source of power supply. Accordingly, the main and auxiliary windings 202 and 203 are energized, the auxiliary winding 203 and the capacitor 210 being poled in the reverse direction with respect to the main winding 202; whereby the rotating fields in the stator 201 effect induction in the squirrel-cage winding 205 so that the rotor 204 is started in the reverse direction.

As the drum 220a is rotated still further in the reverse direction 50°, the member 273 engages the member 263 operating the snap switch 260 into its open position, encircuiting the centrifugal switch 206. Accordingly, at this time the lower line conductor of the source of power supply is connected via the stationary contact 228, the drum contacts 253 and 257, the stationary contact 227, the switch contacts 268 and 269, the bridging member 267, the stationary contact 226, the drum contacts 256 and 252 and the stationary contact 222 to one terminal of the auxiliary winding 203. Accordingly, when the rotor 204 is accelerated in the reverse direction to a speed somewhat in excess of 75% of the synchronous speed thereof, the centrifugal switch 206 operates the bridging member 207 into its open position with respect to the switch contacts 208 and 209 so as to effect deenergization of the auxiliary winding 203 and the capacitor 210 in series relation. At this time, the rotor 204 is accelerated on into its reverse running speed, slightly below the synchronous speed by the slip speed, as a result of the energization of the main winding 202; and the rotor 204 is operated at the running speed in the reverse direction entirely by the energization of the main winding 202.

In order to arrest reverse rotation of the rotor 204, the drum 220a is returned back into its off position. When the drum 220a is rotated back toward its off position somewhat less than its 25° reverse position, the drum contacts 251, etc., disengage the stationary contacts 221, etc., so that the main and auxiliary windings 202 and 203 are deenergized.

Further when the drum 220a is rotated back toward its off position from its 20° reverse position, on into its 0° position, the drum contacts 252 and 255 engage the stationary contacts 222 and 225 respectively completing the previously traced short across the auxiliary winding 203 and the capacitor 210 in series relation. Finally when the drum 220a is rotated back into its 10° reverse position, the member 271 engages the member 263 operating the snap switch 260 back into its closed position. At this time, the rotor 204 is still rotating in the reverse direction, whereby the residual magnetism in the stator 201 causes the squirrel-cage winding 205 to induce a voltage in the auxiliary winding 203, whereby current circulates therefrom through the capacitor 210 in series relation producing an additional magnetic flux that reacts with the squirrel-cage winding 205, whereby the reaction tends to rotate the rotor 204 in the forward direction so that rotation of the rotor 204 in the reverse direction is quickly dynamically braked causing the rotor 204 quickly to assume its rest position.

In view of the foregoing, it will be appreciated that since the rotor 204 is dynamically braked when the drum 220a is operated from either its forward position or its reverse position back into its off position, and since the centrifugal switch 206 is by-passed by the snap switch 260 in the 10° forward-10° reverse positions of the drum 220a, the drum 220a may be quickly operated from either of its extreme positions into the other of its extreme positions with the absolute assurance that the direction of rotation of the rotor 204 will be instantly reversed.

In passing, it is noted that the drum 220a is normally biased by means, not shown, into its off position and may be restrained by means, not shown, in each of its forward and reverse positions, in an obvious manner.

Figure 3:
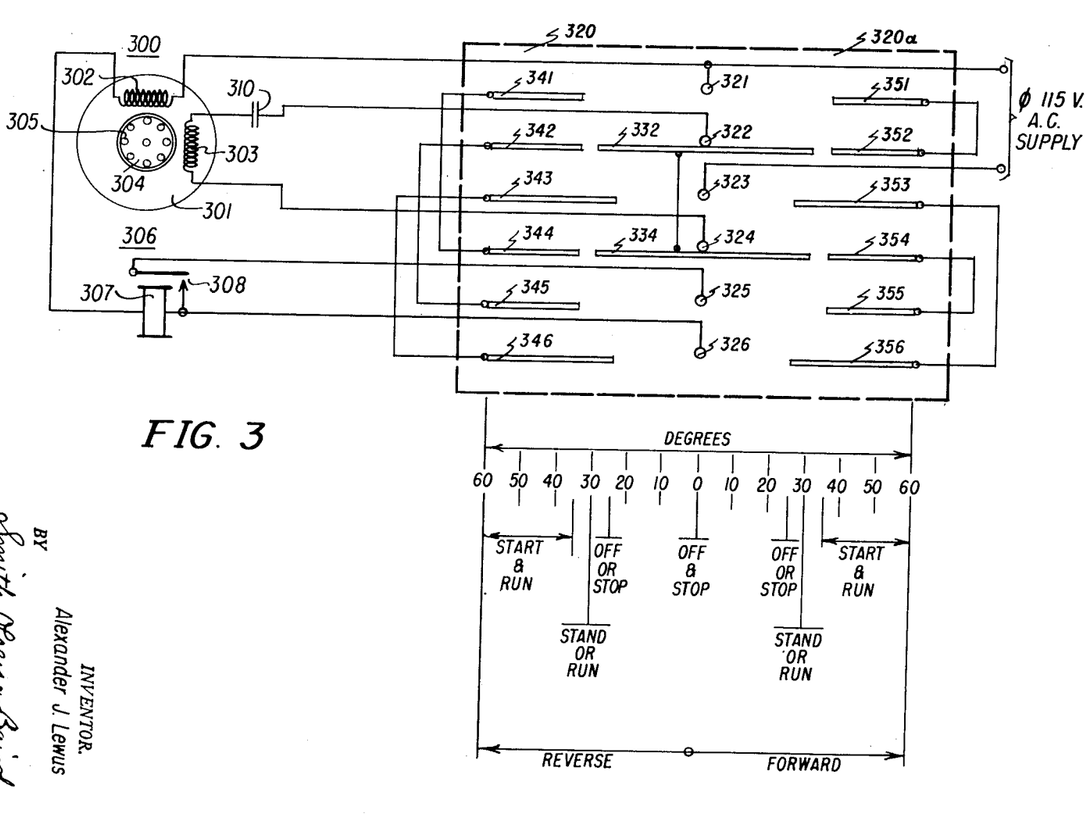

Referring now to Fig. 3 of the drawings, there is illustrated another modified form of the starting-running-braking circuit embodying the features of the present invention and comprising an electric motor 300 of the single-phase split-phase induction type including a stator 301 provided with angularly displaced main and auxiliary windings 302 and 303 and a reversible rotor 304 provided with a squirrel-cage winding 305. Associated with the motor 300 is a relay 306 that is provided with a winding 307 and a pair of contacts 308. The relay 306 is so constructed and arranged that when a heavy current corresponding to a starting condition of the motor 300 traverses the winding 307, the contacts 308 are closed, and when a line current corresponding to a running condition of the motor 300 traverses the winding 307, the contacts 308 are opened; the contacts 308 normally occupying their open position.

Further the circuit comprises a source of single-phase alternating current supply that may be of 115-volts, a capacitor 310 and a circuit controller 320 that may be of any conventional type. Specifically the control 320 may comprise supporting structure, not shown, rotatably mounting a drum 320a (illustrated in flatwise relation) and having an off position, and forward and reverse positions as indicted. The supporting structure carries six stationary contacts 321 to 326, inclusive, that are operatively associated with the individual contacts in three sets carried by the rotatable drum 320a. Specifically the rotatable drum 320a carries a set of off contacts, including the individual contacts 332 and 334, respectively cooperating with the stationary contacts 322 and 324; a set of forward contacts 341 to 346, inclusive, respectively cooperating with the stationary contacts 321 to 326, inclusive; and a set of reverse contacts 351 to 356, inclusive, respectively cooperating with the stationary contacts 321 to 326, inclusive. In the circuit, the upper line conductor of the source of power supply is connected commonly to the stationary contact 321 and to one terminal of the main winding 302; while the lower line conductor of the source of power supply is connected to the stationary contact 323. The other terminal of the main winding 302 is connected to one terminal of the relay winding 307; while the other terminal of the relay winding 307 is commonly connected to one of the relay contacts of the pair 308 and to the stationary contact 326, the other relay contact of the pair 308 being connected to the stationary contact 325. One terminal of the auxiliary winding 303 is connected to the stationary contact 324 and the other terminal thereof is connected to one terminal of the capacitor 310, the other terminal of the capacitor 310 being connected to the stationary contact 322.

The drum contacts 332 and 334 are connected together; the drum contacts 341 and 344 are connected together, the drum contacts 342 and 345 are connected together, the drum contacts 343 and 346 are connected together, the drum contacts 351 and 352 are connected together; the drum contacts 353 and 356 are connected together, and the drum contacts 354 and 355 are connected together. The spread of the drum off contacts 332, etc., is from 0° at the off and stop position approximately 30° on either side thereof in the forward and reverse directions. The drum forward contacts 341, 342, 344 and 345 have a spread in the forward direction from about 35° to 60°; while the drum forward contacts 343 and 346 have a spread in the forward direction from about 25° to 60°. Similarly, the drum reverse contacts 351, 352, 354 and 355 have a spread in the reverse direction from about 35° to 60°; while the drum reverse contacts 353 and 356 have a spread in the reverse direction from about 25° to 60°.

Considering now the operation of the motor 300, when the controller 320 occupies its off position, the main and auxiliary windings 302 and 303 are deenergized, and the auxiliary winding 303 and the capacitor 310 are shorted in series relation. When the drum 320a is rotated in the forward direction (to the right in Fig. 3) 25°, the main winding 302 and the relay winding 307 are energized in series relation via a circuit, including the stationary contact 326, the drum contacts 346 and 343, and the stationary contact 323, whereby the heavy current traversing the main winding 302 and the relay winding 307 effects operation of the relay contacts 308 into closed position. When the drum 320a is rotated further in the forward direction somewhat in excess of 30°, the short across the auxiliary winding 303 and the capacitor 310 in series relation is interrupted; and when the drum 320a is rotated still further in the forward direction 35°, the starting circuit for the auxiliary winding 303 is completed. More particularly, one terminal of the auxiliary winding 303 is connected via the stationary contact 324, the drum contacts 344 and 341, and the stationary contact 321 to the upper line conductor of the source of power supply; while one terminal of the capacitor 310 is connected via the stationary contact 322, the drum contacts 342 and 345, the stationary contact 325, the relay contacts 308, the stationary contact 326, the drum contacts 346 and 343, and the stationary contact 323 to the lower line conductor of the source of power supply. Accordingly, the main and auxiliary windings 302 and 303 are energized, the auxiliary winding 303 and the capacitor 310 being poled in the forward direction with respect to the main winding 302, whereby the rotating fields in the stator 301 effect induction in the squirrel-cage winding 305 so that the rotor 304 is started in the forward direction.

When the rotor 304 is accelerated in the forward direction somewhat below the forward running speed, slightly below the synchronous speed by the slip speed, the current traversing the main winding 302 and the relay winding 307 is substantially reduced, whereby the relay contacts 308 are opened to deenergize the auxiliary winding 303 and the capacitor 310 in series relation. At this time, the rotor 304 is accelerated on into its forward running speed as a result of the energization of the main winding 302; and the rotor 304 is operated at the running speed in the forward direction entirely by the energization of the main winding 302.

In order to arrest forward rotation of the rotor 304, the drum 320a is returned back into its off position. When the drum 320a is rotated back toward its off position somewhat less than its 35° forward position, the drum contacts 341, 342, 344 and 345 disengage the respective stationary contacts 321, 322, 324 and 325 in order to insure deenergization of the auxiliary winding 303 and the capacitor 310 in series relation; and when the drum 320a is rotated back into its 30° forward position, the drum contacts 332 and 334 reengage the stationary contacts 322 and 324 in order to complete the path for shorting the auxiliary winding 303 and the capacitor 310 in series relation. At this time, the main winding 302 is energized in series relation with the relay winding 307, while the auxiliary winding 303 and the capacitor 310 are shorted in series relation, whereby forward rotation of the rotor 304 is immediately arrested to reduce the coupling between the main and auxiliary windings 302 and 303. However the main winding 302 and the relay winding 307 are not damaged by undue heating since the drum 320a in its return back toward its off position interrupts in its 25° forward position the circuit for energizing in series relation the main winding 302 and the relay winding 307.

When the drum 320a is rotated from its off position in the reverse direction (to the left in Fig. 3) 25°, the main winding 302 and the relay winding 307 are energized in series relation via a circuit including the stationary contact 326, the drum contacts 356 and 353 and the stationary contact 323, whereby the heavy current traversing the main winding 302 and the relay winding 307 effects operation of the relay contacts 308 into closed position. When the drum 320a is rotated further in the reverse direction somewhat in excess of 30° the short across the auxiliary winding 303 and the capacitor 310 in series relation is interrupted; and when the drum 320a is rotated still further in the reverse direction 35° the starting circuit for the auxiliary winding 303 is completed. More particularly, one terminal of the capacitor 310 is connected via the stationary contact 322, the drum contacts 352 and 351 and the stationary contact 321 to the upper line conductor of the source of power supply; while one terminal of the auxiliary winding 303 is connected via the stationary contact 324, the drum contacts 354 and 355, the stationary contact 325, the relay contacts 308, the stationary contact 326, the drum contacts 356 and 353, and the stationary contact 323 to the lower line conductor of the source of power supply. Accordingly, the main and auxiliary windings 302 and 303 are energized, the auxiliary winding 303 and the capacitor 310 being poled in the reverse direction with respect to the main winding 302, whereby the rotating fields in the stator 301 effect induction in the squirrel-cage winding 305 so that the rotor 304 is started in the reverse direction.

When the rotor 304 is accelerated in the reverse direction somewhat below the forward running speed, slightly below the synchronous speed by the slip speed, the current traversing the main winding 302 and the relay winding 307 is substantially reduced, whereby the relay contacts 308 are opened to deenergize the auxiliary winding 303 and the capacitor 310 in series relation. At this time, the rotor 304 is accelerated on into its reverse running speed as a result of the energization of the main winding 302; and the rotor 304 is operated at the running speed in the reverse directly entirely by the energization of the main winding 302.

In order to arrest reverse rotation of the rotor 304, the drum 320a is returned back into its off position. When the drum 320a is rotated back toward its off position somewhat less than its 35° reverse position, the drum contacts 351, 352, 354 and 355 disengage the respective stationary contacts 321, 322, 324 and 325 in order to insure deenergization of the auxiliary winding 303 and the capacitor 310 in series relation; and when the drum 320a is rotated back into its 30° reverse position, the drum contacts 332 and 334 reengage the stationary contacts 322 and 324 in order to complete the path for shorting the auxiliary winding 303 and the capacitor 310 in series relation. At this time, the main winding 302 is energized in series relation with the relay winding 307 while the auxiliary winding 303 and the capacitor 310 are shorted in series relation, whereby the forward rotation of the rotor 304 is immediately arrested to reduce the coupling between the main and auxiliary windings 302 and 303. However the main winding 302 and the relay winding 307 are not damaged by undue heating since the drum 320a in its return back toward its off position interrupts in its 25° reverse position, the circuit for energizing in series relation the main winding 302 and the relay winding 307.

In view of the foregoing, it will be appreciated that since the rotor 304 is dynamically braked when the drum 320a is operated either from its forward position or its reverse position back into its off position, the drum 320a may be quickly operated from either of its extreme positions into the other of its extreme positions with the absolute assurance that the direction of rotation of the rotor 304 will be instantly reversed.

In passing, it is noted that the drum 320a is normally biased by means, not shown, into its off position and may be restrained by means, not shown, in each of its forward and reverse positions in an obvious manner.

In view of the foregoing, it is apparent that there has been provided improved starting-running-braking circuits for induction motors of the single-phase split-phase or capacitor type that insure ready starting and running of the motors in either direction and positive reversal of the direction of rotation of the motors incident to operation of the associated circuit controllers between their extreme positions, which arrangements employ the same capacitors for starting and for instantly dynamically braking purposes.

While there has been described what is at present considered to be the preferred embodiment of the invention, it will be understood that various modifications may be made therein, and it is intended to cover in the appended claims all such modifications that fall within the true spirit and scope of the invention.

What is claimed is:

1. In a control circuit including an induction motor provided with a stator having angularly displaced main and auxiliary windings and a reversible rotor having a squirrel-cage winding, a capacitor, a control switch, means responsive to a starting condition of said rotor in either direction for operating said control switch into its closed position, and a source of single phase alternating current supply; the combination comprising a circuit controller provided with an off position and forward and reverse positions respectively disposed on opposite sides of said off position, means for selectively operating said controller between its different positions, means responsive to operation of said controller from its off position into its forward position for connecting said main winding to said source and for connecting said auxiliary winding and said capacitor and said control switch in series relation to said source so that said main and auxiliary windings are phased to effect forward starting of said rotor, means responsive to a forward running condition of said rotor for operating said control switch into its open position so that forward running of said rotor is effected by said main winding, means responsive to operation of said controller from its off position into its reverse position for connecting said main winding to said source and for connecting said auxiliary winding and said capacitor and said control switch in series relation to said source so that said main and auxiliary windings are phased to effect reverse starting of said rotor by said main and auxiliary windings, means responsive to a reverse running condition of said rotor for operating said control switch into its open position so that reverse running of said rotor is effected by said main winding, means responsive to operation of said controller from either one of its other positions back into its off position for disconnecting said auxiliary winding and said capacitor and said control switch in series relation from said source and for completing a short across said auxiliary winding and said capacitor in series relation so as to effect dynamic braking of said rotor and then for disconnecting said main winding from said source, and additional means responsive to operation of said controller from its off position into either of its other positions for interrupting said short across said auxiliary winding and said capacitor in series relation.

2. In a control circuit including an induction motor provided with a stator having angularly displaced main and auxiliary windings and a reversible rotor having a squirrel-cage winding, a capacitor, a control switch, means governed by rotation of said rotor in either direction at a relatively low speed for operating said control switch into its closed position, and a source of single-phase alternating current supply; the combination comprising a circuit controller provided with an off position and forward and reverse positions respectively disposed on opposite sides of said off position, means for selectively operating said controller between its different positions, means responsive to operation of said controller from its off position into its forward position for connecting said main winding to said source and for connecting said auxiliary winding and said capacitor and said control switch in series relation to said source so that said main and auxiliary windings are phased to effect forward starting of said rotor by said main and auxiliary windings, means governed by forward rotation of said rotor at a relatively high speed for operating said control switch into its open position so that forward running of said rotor is effected by said main winding, means responsive to operation of said controller from its off position into its reverse position for connecting said main winding to said source and for connecting said auxiliary winding and said capacitor and said control switch in series relation to said source so that said main and auxiliary windings are phased to effect reverse starting of said rotor by said main and auxiliary windings, means governed by reverse rotation of said rotor at a relatively high speed for operating said control switch into its open position so that reverse running of said rotor is effected by said main winding, means responsive to operation of said controller from either one of its other positions back into its off position for disconnecting said auxiliary winding and said capacitor and said control switch in series relation from said source and for completing a short across said auxiliary winding and said capacitor in series relation so as to effect dynamic braking of said rotor and then for disconnecting said main winding form said source, and additional means responsive to operation of said controller from its off position into either of its other positions for interrupting said short across said auxiliary winding and said capacitor in series relation.

3. In a control circuit including an induction motor provided with a stator having angularly displaced main and auxiliary windings and a reversible rotor having a squirrel-cage winding, a capacitor, a control relay provided with a winding and a pair of contacts, said relay contacts normally occupying their open position, said relay winding being responsive to a heavy current traversing it to operate said relay contacts into their closed position, and a source of single-phase alternating current supply; the combination comprising a circuit controller provided with an off position and forward and reverse positions respectively disposed on opposite sides of said off position, means for selectively operating said controller between its different positions, means responsive to operation of said controller from its off position into its forward position for connecting said main winding and said relay winding in series relation to said source and for connecting said auxiliary winding and said capacitor and said relay contacts in series relation to said source so that said main and auxiliary windings are phased to effect forward starting of said rotor by said main and auxiliary windings, said relay winding being responsive to a light current traversing it to return said relay contacts into their open position so that forward running of said rotor is effected by said main winding, means responsive to operation of said controller from its off position into its reverse position for connecting said main winding and said relay winding in series relation to said source and for connecting said auxiliary winding and said capacitor and said relay contacts in series relation to said source so that said main and auxiliary windings are phased to effect reverse starting of said rotor by said main and auxiliary windings, said relay winding being responsive to a light current traversing it to return said relay contacts into their open position so that reverse running of said rotor is effected by said main winding, means responsive to operation of said controller from either one of its other positions back into its off position for disconnecting said auxiliary winding and said capacitor and said relay contacts in series relation from said source and for completing a short across said auxiliary winding and said capacitor in series relation so as to effect dynamic braking of said rotor and then for disconnecting said main winding and said relay winding in series relation from said source, and additional means responsive to operation of said controller from its off position into either of its other positions for interrupting said short across said auxiliary winding and said capacitor in series relation.

4. In a control circuit including an induction motor provided with a stator having angularly displaced main and auxiliary windings and a reversible rotor having a squirrel-cage winding, a capacitor, a control switch, means responsive to a starting condition of said rotor in either direction for operating said control switch into its closed position and a source of single phase alternating current supply; the combination comprising a circuit controller provided with an off position and forward and reverse positions respectively disposed on opposite sides of said off position, means for selectively operating said controller between its different positions, means responsive to operation of said controller from its off position into its forward position for connecting said main winding to said source and for connecting said auxiliary winding and said capacitor and said control switch in series relation to said source so that said main and auxiliary windings are phased to effect forward starting of said rotor by said main and auxiliary windings, means responsive to a forward running condition of said rotor for operating said control switch into its open position so that forward running of said rotor is effected by said main winding, means responsive to operation of said controller from its off position into its reverse position for connecting said main winding to said source and for connecting said auxiliary winding and said capacitor and said control switch in series relation to said source so that said main and auxiliary windings are phased to effect reverse starting of said rotor by said main and auxiliary windings, means responsive to a reverse running condition of said rotor for operating said control switch into its open position so that reverse running of said rotor is effected by said main winding, means responsive to operation of said controller from either one of its other positions back into its off position for disconnecting said auxiliary winding and said capacitor and said control switch in series relation from said source and for completing a short across said main winding and across said auxiliary winding and said capacitor in series relation so as to effect dynamic braking of said rotor and then for disconnecting said main winding from said source, and additional means responsive to operation of said controller from its off position into either of its other positions for interrupting said short across said main winding and across said auxiliary winding and said capacitor in series relation.

5. In a control circuit including an induction motor provided with a stator having angularly displaced main and auxiliary windings and a reversible rotor having a squirrel-cage winding, a capacitor, a control switch, means responsive to a starting condition of said rotor in either direction for operating said control switch into its closed position, and a source of single phase alternating current supply; the combination comprising a circuit controller provided with an off position and intermediate forward and reverse positions respectively disposed on opposite sides of said off position and final forward and reverse positions respectively disposed adjacent to said intermediate forward and reverse positions, means for selectively operating said controller between its different positions, means responsive to operation of said controller from its off position into its intermediate forward position for connecting said main winding to said source and for connecting said auxiliary winding and said capacitor and said control switch in series relation to said source so that said main and auxiliary windings are phased to effect forward starting of said rotor by said main and auxiliary windings, means responsive to operation of said controller from its intermediate forward position into its final forward position for interrupting a previously completed by-pass path around said control switch, means responsive to a forward running condition of said rotor for operating said control switch into its open position so that forward running of said rotor is effected by said main winding, means responsive to operation of said controller from its off position into its intermediate reverse position for connecting said main winding to said source and for connecting said auxiliary winding and said capacitor and said control switch in series relation to said source so that said main and auxiliary windings are phased to effect reverse starting of said rotor by said main and auxiliary windings, means responsive to operation of said controller from its intermediate reverse position into its final reverse position for interrupting said previously completed by-pass path around said control switch, means responsive to a reverse running condition of said rotor for operating said control switch into its open position so that reverse running of said rotor is effected by said main winding, means responsive to operation of said controller from either one of its final positions back into the adjacent one of its intermediate positions for completing said by-pass path around said control switch, means responsive to operation of said controller from either one of its intermediate positions back into its off position for disconnecting said auxiliary winding and said capacitor and said control switch in series relation from said source and for completing a short across said auxiliary winding and said capacitor in series relation so as to effect dynamic braking of said rotor and then for disconnecting said main winding from said source, and additional means responsive to operation of said controller from its off position into either of its intermediate positions for interrupting said short across said auxiliary winding and said capacitor in series relation.

6. In a control circuit including an induction motor provided with a stator having angularly displaced main and auxiliary windings and a reversible rotor having a squirrel-cage winding, a capacitor, a control switch, means responsive to a starting condition of said rotor in either direction for operating said control switch into its closed position, and a source of single phase alternating current supply; the combination comprising a circuit controller provided with an off position and intermediate forward and reverse positions respectively disposed on opposite sides of said off position and final forward and reverse positions respectively disposed adjacent to said intermediate forward and reverse positions, means for selectively operating said controller between its different positions, a snap-acting switch arranged in by-passing relation with said control switch and occupying its closed position when said controller occupies its off position, means responsive to operation of said controller from its off position into its intermediate forward position for connecting said main winding to said source and for connecting said auxiliary winding and said capacitor and said control switch in series relation to said source so that said main and auxiliary windings are phased to effect forward starting of said rotor by said main and auxiliary windings, means responsive to operation of said controller from its intermediate forward position into its final forward position for operating said snap-switch into its open position, means responsive to a forward running condition of said rotor for operating said control switch into its open position so that forward running of said rotor is effected by said main winding, means responsive to operation of said controller from its off position into its intermediate reverse position for connecting said main winding to said source and for connecting said auxiliary winding and said capacitor and said control switch in series relation to said source so that said main and auxiliary windings are phased to effect reverse starting of said rotor by said main and auxiliary windings, means responsive to operation of said controller from its intermediate reverse position into its final reverse position for operating said snap-switch into its open position, means responsive to a reverse running condition of said rotor for operating said control switch into its open position so that reverse running of said rotor is effected by said main winding, means responsive to operation of said controller from either one of its final positions back into the adjacent one of its intermediate positions for operating said snap-switch into its closed position, means responsive to operation of said controller from either one of its intermediate positions back into its off position for disconnecting said auxiliary winding and said capacitor and said control switch in series relation from said source and for completing a short across said auxiliary winding and said capacitor in series relation so as to effect dynamic braking of said rotor and then for disconnecting said main winding from said source, and additional means responsive to operation of said controller from its off position into either of its intermediate positions for interrupting said short across said auxiliary winding and said capacitor in series relation.

7. In a control circuit including an induction motor provided with a stator having angularly displaced main and auxiliary windings and a reversible rotor having a squirrel-cage winding, a capacitor, a control switch, means responsive to a starting condition of said rotor in either direction for operating said control switch into its closed position, and a source of single phase alternating current supply; the combination comprising a circuit controller provided with an off position and intermediate forward and reverse positions respectively disposed on opposite sides of said off position and final forward and reverse positions respectively disposed adjacent to said intermediate forward and reverse positions, means for selectively operating said controller between its different positions, means responsive to operation of said controller from its off position into its intermediate forward position for connecting said main winding to said source and for interrupting a previously completed short across said auxiliary winding and said capacitor in series relation, means responsive to operation of said controller from its intermediate forward position into its final forward position for connecting said auxiliary winding and said capacitor and said control switch in series bridge relation to said source so that said main and auxiliary windings are phased to effect forward starting of said rotor by said main and auxiliary windings, means responsive to a forward running condition of said rotor for operating said control switch into its open position so that forward running of said rotor is effected by said main winding, means responsive to operation of said controller from its off position into its intermediate reverse position for connecting said main winding to said source and for interrupting said previously completed short across said auxiliary winding and said capacitor in series relation, means responsive to operation of said controller from its intermediate reverse position into its final position for connecting said reverse auxiliary winding and said capacitor and said control switch in series relation to said source so that said main and auxiliary windings are phased to effect reverse starting of said rotor by said main and auxiliary windings, means responsive to a reverse running condition of said rotor for operating said control switch into its open position so that reverse running of said rotor is effected by said main winding, means responsive to operation of said controller from either one of its final positions back into the adjacent one of its intermediate positions for disconnecting said auxiliary winding and said capacitor and said control switch in series relation from said source and for completing said short across said auxiliary winding and said capacitor in series relation so as to effect dynamic braking of said rotor, and means responsive to operation of said controller from either one of its intermediate positions back into its off position for disconnecting said main winding from said source.

8. In a control circuit including an induction motor provided with a stator having angularly displaced main and auxiliary windings and a reversible rotor having a squirrel-cage winding, a capacitor, a control relay provided with a winding and a pair of contacts, said relay contacts normally occupying their open position, said relay winding being responsive to a heavy current traversing it to operate said relay contacts into their closed position, and a source of single-phase alternating current supply; the combination comprising a circuit controller provided with an off position and intermediate forward and reverse positions respectively disposed on opposite sides of said off position and final forward and reverse positions respectively disposed adjacent to said intermediate forward and reverse positions, means for selectively operating said controller between its different positions, means responsive to operation of said controller from its off position into its intermediate forward position for connecting said main winding and said relay winding in series relation to said source and for interrupting a previously completed short across said auxiliary winding and said capacitor in series relation, means responsive to operation of said contrdller from its intermediate forward position into its final forward position for connecting said auxiliary winding and said capacitor and said control switch in series relation to said source so that said main and auxiliary windings are phased to effect forward starting of said rotor by said main and auxiliary windings, said relay winding being responsive to a light current traversing it to return said relay contacts into their open position so that forward running of said rotor is effected by said main winding, means responsive to operation of said controller from its off position into its intermediate reverse position for connecting said main winding to said source and for interrupting said previously completed short across said auxiliary winding and said capacitor in series relation, means responsive to operation of said controller from its intermediate reverse position into its final reverse position for connecting said auxiliary winding and said capacitor and said control switch in series relation to said source so that said main and auxiliary windings are phased to effect reverse starting of said rotor by said main and auxiliary windings, said relay winding being responsive to a light current traversing it to return said relay contacts into their open position so that reverse running of said rotor is effected by said main winding, means responsive to operation of said controller from either one of its final positions back into the adjacent one of its intermediate positions for disconnecting said auxiliary winding and said capacitor and said control switch in series relation from said source and for completing said short across said auxiliary winding and said capacitor in series relation so as to effect dynamic braking of said rotor, and means responsive to operation of said controller from either one of its intermediate positions back into its off position for disconnecting said main winding and said relay winding in series relation from said source.

9. The control circuit combination set forth in claim 1, wherein said dynamic braking of said rotor instantly arrests rotation thereof so as to prevent overrun of said rotor when said controller is instantly operated from either its forward position or its reverse position back into its off position.

10. The control circuit combination set forth in claim 1, wherein said dynamic braking of said rotor instantly arrests rotation thereof so that said controller may be instantly operated between its forward and reverse positions through its off position to effect a correspondingly instant reversal of the direction of rotation of said rotor.

ALEXANDER J. LEWUS.

References Cited in the file of this patent

UNITED STATES PATENTS

| Number | Name | Date |
|---|---|---|
| 2,380,270 | Suhr et al. | July 10, 1945 |
| 2,473,244 | Fuller | June 14, 1949 |